(12) United States Patent
Baden et al.

(10) Patent No.: US 7,945,725 B2
(45) Date of Patent: May 17, 2011

(54) ACCESS CONTROL LIST RULE COMPRESSION USING METER RE-MAPPING

(75) Inventors: Eric Baden, Saratoga, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 524 days.

(21) Appl. No.: 12/101,696

(22) Filed: Apr. 11, 2008

(65) Prior Publication Data

US 2009/0259810 A1   Oct. 15, 2009

(51) Int. Cl.
*G06F 12/00* (2006.01)
(52) U.S. Cl. .......................................... 711/108; 711/149
(58) Field of Classification Search .................... 711/108
See application file for complete search history.

(56) References Cited

U.S. PATENT DOCUMENTS

| | | | |
|---|---|---|---|
| 2002/0163935 A1* | 11/2002 | Paatela et al. | 370/466 |
| 2002/0186661 A1* | 12/2002 | Santiago et al. | 370/252 |
| 2004/0095927 A1* | 5/2004 | Chang et al. | 370/388 |
| 2006/0039374 A1* | 2/2006 | Belz et al. | 370/389 |
| 2009/0097407 A1* | 4/2009 | Buskirk et al. | 370/235.1 |

* cited by examiner

*Primary Examiner* — Tuan V Thai
*Assistant Examiner* — Ngoc V Dinh
(74) *Attorney, Agent, or Firm* — Brake Hughes Bellermann LLP

(57) ABSTRACT

A system may include a content addressable memory (CAM) that is configured to include multiple services, receive a key, where the key includes source port information and IP information related to a packet received on one of multiple ports, and output a match index value in response to a search of the CAM using the key. The system may include a policy memory module that is configured to receive the match index value and to output meter controls and a meter address based on the match index value, a port meter map module that is configured to receive the source port information and to output a mask value and a per port meter value, and a remapping module that is configured to receive the meter address, receive the mask value and the per port meter value, and modify the meter address based on those values.

20 Claims, 3 Drawing Sheets

ACCESS CONTROL LIST RULE COMPRESSION USING METER RE-MAPPING

TECHNICAL FIELD

This description relates to access control list (ACL) rule compression using meter re-mapping.

BACKGROUND

In a switching system, packets may be received on one of multiple ports. The packets may be processed by the switching system by applying one or more rules to the received packet. Certain received packets may receive preferential treatment when compared to other packets. As such, it may be desirable to meter and regulate the packets based on this preferential treatment in the switching system. It also may be desirable to apply different rules to the received packets based on the port on which the packet was received. However, it may be expensive and inefficient to allocate rules per port as well as to meter the packets through the switching system.

SUMMARY

The details of one or more implementations are set forth in the accompanying drawings and the description below. Other features will be apparent from the description and drawings, and from the claims.

DETAILED DESCRIPTION

Figure 1:
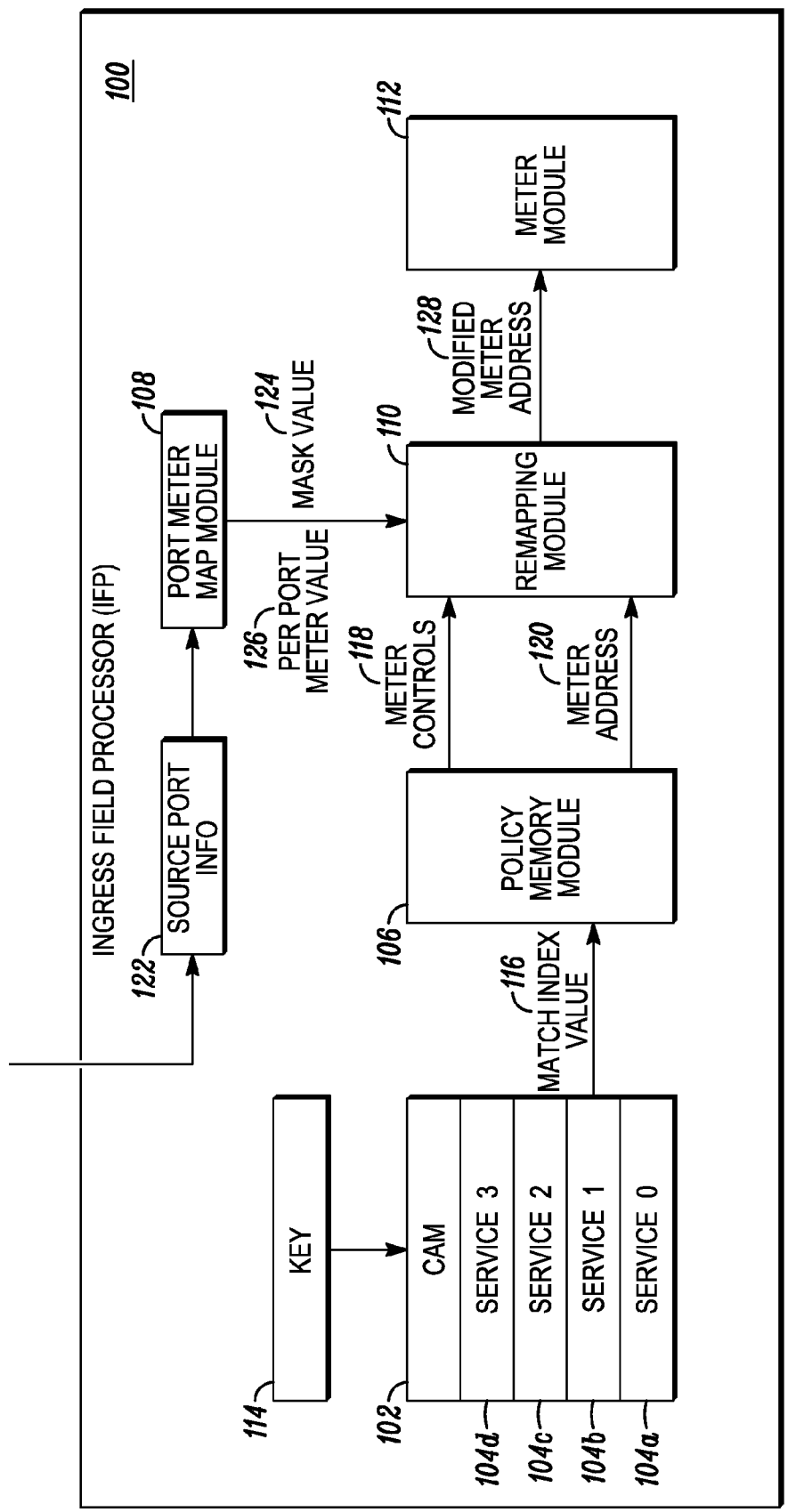
FIG. 1 is a block diagram of an exemplary an ingress field processor (IFP).

Referring to FIG. 1, an ingress field processor (IFP) 100 is illustrated. The IFP 100, may include a content addressable memory (CAM) 102 having multiple services 104a-104d, a policy memory module 106, a port meter map module 108, a remapping module 110, and a meter module 112. In one exemplary implementation, the IFP 100 may be a component in an ingress module. The ingress module, as discussed in more detail below with respect to FIG. 2, may include switching functionality for determining to which destination port a packet should be directed.

The CAM 102 may be arranged and configured to include multiple services 104a-104d. The multiple services 104a-104d within the CAM 102 may be a combination of multiple of rules. For example, the rules may be related to access control lists (ACLs). Each of the services 104a-104d may include a group of entries, each of which may have different values in the fields. The grouping of entries may represent one of the services 104a-104d. Typically, each of the services 104a-104d may map to one of multiple meters contained within the meter module 112. In one exemplary implementation, the CAM 102 may include many multiple services beyond what is illustrated in FIG. 1.

The CAM 102 may be configured to use packet information to perform table look-ups. For example, a packet may be received on one of multiple ports and forwarded to the ingress module. The received packet may be parsed to enable table look-ups and modifications to the received packet. The table look-ups may enable the data within the packet to be analyzed. The table look-ups may be based on internet protocol (IP) address, virtual local area network (VLAN) address, medium access control (MAC) address, or other address information as may be identified as part of the received packet. Additionally, look-ups may be based on a physical port on which the packet arrived.

The CAM 102 may be a semiconductor integrated circuit that allows a table of data to be stored in a memory array that incorporates circuitry to permit a search function. CAM 102 may be configured to perform look-up functions based on the parsed packet information to make intelligent forwarding decisions of the packet. In one exemplary implementation, the CAM 102 may be a ternary CAM (TCAM). In one exemplary implementation, the CAM 102 may include multiple CAMs, which may be concatenated together to form very large tables capable of storing over one million entries.

The CAM 102 may receive a key 114, where the key includes source port information and internet protocol (IP) information related to a received packet on one of the multiple ports. The key 114 may be based on information gained during parsing of the received packets. The key 114 may be applied to the CAM 102 to enable the table look-ups in the CAM 102. The CAM 102 provides matches to the key 114.

The CAM 102 may output a match index value 116 in response to a search of the CAM 102 using the key 114. Thus, a match in the CAM 102 using the key 114 results in the output of the match index value 116. The CAM 102 may be configured to search its memory contents for a given key 114. The CAM 102 may provide a single bit indication of whether a match is found. If a match is found, the CAM 102 may output the match index value 116, which may indicate which entry of the memory location that resulted in the match.

The policy memory module 106 may be arranged and configured to receive the match index value 116 from the CAM 102 and to output meter controls 118 and a meter address 120 based on the match index value 116. The policy memory module 106 may be, for example, a random access memory (RAM) module. In other exemplary implementations, the policy memory module 106 may be other types of memory modules. The policy memory module 106 may include rules that determine what actions may be taken on a received packet. For example, the policy memory module 106 may include rules that indicate to drop a packet, to change a packet, or to perform other actions on the packet. Other actions may include determining which port or ports to send the packet.

In one exemplary implementation, the policy memory module 106 may be used to drop the packet based on one or more IP addresses. For example, one of the services 104a-104d within the CAM 102 may identify a group of IP addresses that are to be dropped by the ingress module. When the packet is received, a key 114 may be generated based on the packet's IP address. The key 114 may be used by the CAM 102 to match to the appropriate service. When the CAM 102 determines a match, an appropriate match index value 116 is outputted and received by the policy memory module 106. The match index value 116 may point to the appropriate rule within the policy memory module 106, which may indicate to drop the packet based on the IP address of the packet. In other exemplary implementations, as discussed above, the policy memory module 106 may include one or more rules to take other types of actions on the received packets.

The meter controls 118 may provide information to the meter module 112 to enable the meter module 112 to control the flow of packets through the ingress module. The meter address 120 may provide address information to the meter module 112 as to which meter is to be used.

The port meter map module 108 may be arranged and configured to receive source port information 122 and to output a mask value 124 and a per port meter value 126. In one exemplary implementation, the port meter map module 108 may be a memory module that includes one or more tables that maps the source port information 122 to a mask value 124 and a per port meter value 126. In one exemplary implementation, the mask value 124 may include a 12-bit mask. The per port meter value 126 may include a 12-bit value per port. The mask value 124 and the per port meter value 126 may be outputted to the remapping module 110 and may be used to modify the meter address 120 that was outputted by the policy memory module 106.

The remapping module 110 may be arranged and configured to receive the meter address 120 and the meter controls 118. The remapping module 110 also may receive the mask value 124 and the per port meter value 126 from the port meter map module 108. The remapping module 110 may be configured to modify the meter address 120 based on the mask value 124 and the per port meter value 126. The remapping of the meter address 120 to a modified meter address enables the allocation of services 104a-104d to be done on a per port and a per meter basis. The use of the port meter map module 108 and the remapping module 110 enables the allocation of services 104a-104d to be performed in this manner. In this manner, there is no need to instantiate each of the rules on every port to enable the services and the meters to be allocated on a per port basis. The port meter map module 108 and the remapping module 110 allow per port remapping of meters so that all of the rules representing a service can use different meters per port. The port meter map module 108 and the remapping module 110 provide a mechanism to provide a bit map and new address fields, which may be selected per port and may be used to modify the meter address 120 associated with the rule.

The meter module 112 may be arranged and configured to include multiple meters. Each of the meters may be arranged and configured to meter received packets. The meter module 112 may use the modified meter address 128 to map the packet to the appropriate meter. The meter module 112 may control the rate at which packets may be allowed to progress through the ingress module. Each of the meters within the meter module 112 may include logic for tracking bandwidth and determining how much allowed bandwidth has been used. The meters may track how much bandwidth may be allowed on a per port and per service basis. The use of the modified meter address 128 enables the meters within the meter module 112 to be used on a per port basis without having to replicate the rules and services 104a-104d of the CAM 102 for each of the ports. In this manner, cost savings may be realized and/or efficiency may be improved.

Figure 2:
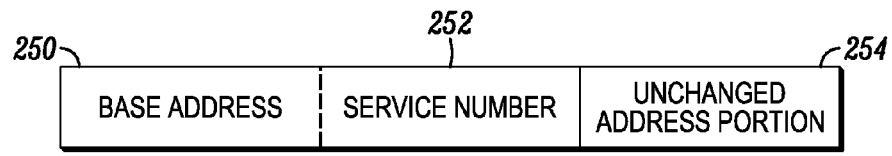
FIG. 2 is a block diagram of an exemplary modified meter address.

Referring to FIG. 2, an exemplary modified meter address 200 is illustrated. The modified meter address 200 may be one exemplary implementation of the modified meter address 128 of FIG. 1. The modified meter address 200 may include a first section 250, a second section 252, and a third section 254.

The first section 250 may include a base address. The base address may provide information such as the source port and an indication of the meters that a particular port may be allowed to access. The second section 252 may include a service number, where the service number may identify an allocation of the services 104a-104d for each of the ports. The use of the service number may allow a flexible allocation of services 104a-104d per port. The mask value 124 may indicate which bits of the meter address 120 to replace to become the modified meter address 128. The mask value 124 may indicate a number of how many leading bits of the meter address 120 that are to be replaced.

The third section 254 may include an unchanged address portion. The unchanged address portion may be a portion of the meter address 120 that is not changed by the remapping module 110. In one exemplary implementation, the size of the first section 250 and the second section 252 may be changed and configurable. Thus, the size of the base address and the service number may be configurable.

Figure 3:
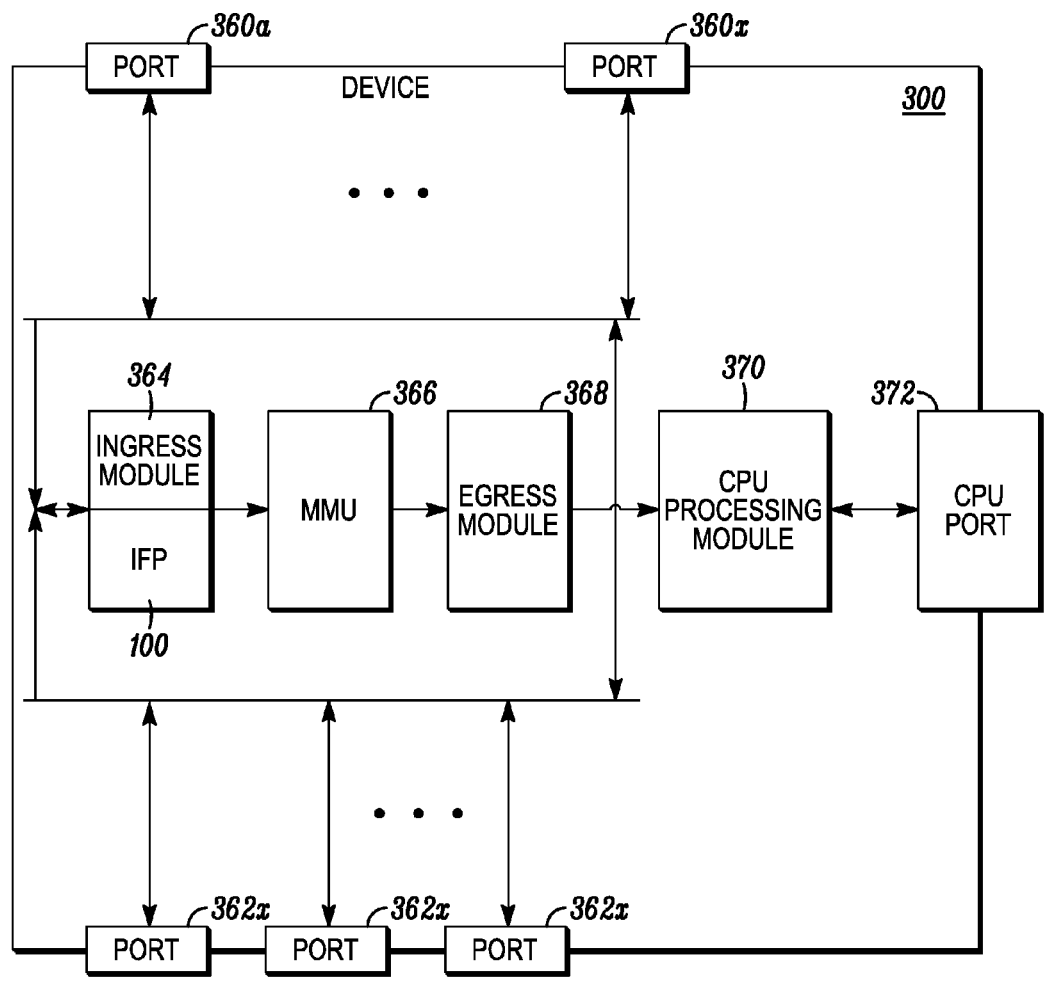
FIG. 3 is a block diagram of an exemplary system for a switching device that includes the IFP of FIG. 1.

Referring to FIG. 3, a device 300 is illustrated where the device 300 includes ISP 100. The device 300 may be a switching system such as, for example, a router, a switch, a digital subscriber line access multiplexer (DSLAM) or any other type of switching system through which packets are routed. In one exemplary implementation, the device 300 may be implemented as an integrated circuit.

Device 300 may include multiple ports 360a-360x, multiple ports 362x, an ingress module 364, a memory management unit (MMU) 366, an egress module 368, a central processing unit (CPU) processing module 370, and a CPU port 372. The ingress module 364 may include the ISP 100, as described above with respect to FIG. 1.

The ingress module 364 may include switching functionality for determining to which destination port a packet should be directed. Ports 360a-360x may be one or more internal ports such as, for example, high speed fabric ports. The ports 360a-360x may be used to interconnect the various components in the device 300 and thus form an internal fabric for transporting packets between external source ports and one or more external destination ports. As such, the ports 360a-360x may not be externally visible outside the device 300. Packets may be received and transmitted on one or more of the external ports 362x. In one exemplary implementation, the ports 362x may be Ethernet ports.

The MMU 366 may be configured to store packet information and to perform resource checks. The egress module 368 may be configured to perform packet modification and to transmit the packets to at least one appropriate destination port. One of the ports on the device 300 may be the CPU port 372. The CPU port 372 may be used to send and receive information to and from external switching-routing control entities or CPUs. The device 300 may interface with external/ off-chip CPUs through the CPU processing module 370. The CPU processing module 370 may interface with a protocol control information (PCI) bus that connects the device 300 to an external CPU.

In one exemplary implementation, a SERDES module (not shown) may be configured to convert information entering the device 300 into bytes before the information is transmitted through the device 300. The SERDES module also may perform analog and digital checks on the information before it transmits the information to the device 300.

Figure 4:
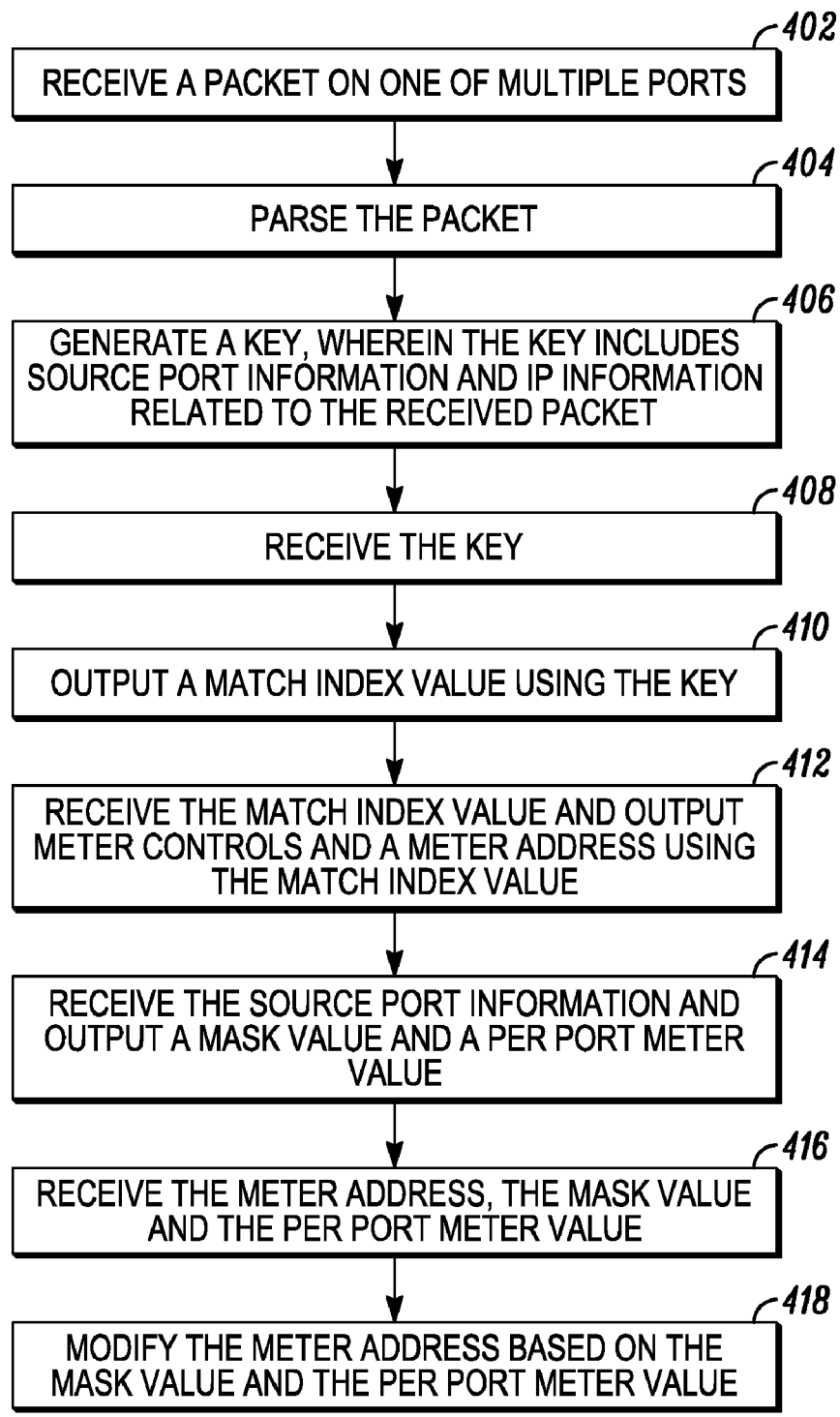
FIG. 4 is a flowchart illustrating example operations of the device of FIG. 1.

Referring to FIG. 4, a process 400 illustrates example operations of the ISP 100 of FIG. 1. Process 400 may include receiving a packet on one of multiple ports (402), parsing the packet (404), generating a key, where the key includes source port information and IP information related to the received packet (406), receiving the key (408), outputting a match index value using the key (410), receiving the match index value and outputting meter controls and a meter address using the match index value (412), receiving the source port information and outputting a mask value and a per port meter value (414), receiving the meter address, the mask value and the per port meter value (416), and modifying the meter address based on the mask value and the per port meter value (418).

Process 400 may include receiving a packet on one of multiple ports (402). For example, ports 362x may be configured to receive a packet (402). The device 300 may receive the packet on one of the multiple ports 362x (402). Process 400 may include parsing the packet (404). For example, the ingress module 364 may be configured to parse the packet (404).

Process 400 may include generating a key, where the key includes source port information and IP information related to the receive packet (406). For example, the ingress module 364 may be configured to generate the key 114 (406). The key 114 may include the source port information and the IP information related to the received packet.

Process 400 may include receiving the key (408). For example, the CAM 102, which is part of the ISP 100, may be configured to receive the key 114 (408). The CAM 102 also may be configured to output a match index value 116 using the key 114 (410). As discussed above with respect to FIG. 1, the CAM 102 may perform table look-ups using the key 114 and output the match index value 116 when a match is found in the CAM 102.

Process 400 may include receiving the match index value and outputting meter controls and a meter address using the match index value (412). For example, the policy memory module 106 may be configured to receive the match index value 116 and output meter controls 118 and a meter address 120 using the match index value 116 (412).

Process 400 may include receiving the source port information and outputting the mask value and a per port meter value (414). For example, the port meter map module 108 may be configured to receive source port information 122 and to output a mask value 124 and a per port meter value 126 (414).

Process 400 may include receiving the meter address, the mask value and the per port meter value (416). For example, the remapping module 110 may be configured to receive the meter address 120 from the policy memory module 106 and to receive the mask value 124 and the per port meter value 126 from the port meter map module 108 (416).

Process 400 may include modifying the meter address based on the mask value and the per port meter value (418). For example, the remapping module 110 may be configured to modify the meter address 120 based on the mask value 124 and the per port meter value 126 (418). In this manner, process 400 enables per port remapping of meters so that all the rules representing a service can use different meters per port. For example, the meter module 112, which may include multiple meters, may be remapped such that the services 104a-104d of the CAM 102 may be allocated on a per port basis to the different meters. Process 400 enables rules such as, for example, ACL rules for each of the services 104a-104d to be defined independently of the source port.

In other exemplary implementations, the port meter map module 108 may use other and/or additional information in addition to the source port information 122 to determine a mask value 124 and a meter value 126. For example, the mapping may be based on other criteria other than or in addition to the source port. For instance, this other criteria could include information based on VLAN or VLAN groups, or any other parameter which may represent a group of network connections.

Using the ISP 100 and the process 400 may enable a reduction in the number of rules needed because the rules do not have to be instantiated on a per port basis. For example, if there are 4 services in the CAM 102 and there are 32 ports (e.g., ports 362x), then 128 entries may be needed in the CAM 102, assuming each service was one entry in the CAM 102. However, if each service is 10 entries in the CAM 102, representing multiple IP addresses for each service, then 10 times as many entries may be needed in the CAM 102. ISP 100 may enable a 32:1 reduction in the number of entries in the CAM 102 that may be needed, since one CAM 102 may be provided to service all 32 ports. The port meter map module 108 and the remapping module 110 enable one entry in the CAM 102 to be used instead of 32 entries in the CAM 102, which would otherwise be needed. Additionally, a 10:1 reduction may be realized in the number of rules needed because the rules do not have to be allocated per port. Instead, the rules are allocated on a per service basis.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   a content addressable memory that is arranged and configured to:
      receive a key which is based on source port information of a packet received on one of multiple ports, and
      output a match index value in response to a search of the content addressable memory using the key;
   a policy memory module that is arranged and configured to receive the match index value from the content addressable memory and to output meter controls and a meter address based on the match index value;
   a port meter map module that is arranged and configured to receive the source port information, map the source port information to a per port meter value and a mask value, and to output the mask value and the per port meter value to a remapping module; and
   the remapping module that is arranged and configured to:
      receive the meter address from the policy memory module;
      receive the mask value and the per port meter value from the port meter map module; and
      modify the meter address based on the mask value and the per port meter value.

2. The system of claim 1 wherein the content addressable memory is configured to include multiple services, each including a combination of multiple rules.

3. The system of claim 2 wherein the rules are related to access control lists.

4. The system of claim 2 wherein:
   the remapping module is configured to output the modified meter address to a meter module; and
   the system further comprises the meter module having multiple meters that are arranged and configured to meter received packets, wherein the meter module is configured to route each received packet to one of the meters based on the modified meter address.

5. The system of claim 4 wherein the modified meter address comprises:
   a first section that includes a base address for the source port and the meter the source port can access; and
   a second section that includes a service number, wherein the service number identifies an allocation of the services for each of the source ports.

6. The system of claim 1 wherein the mask value indicates which bits in the meter address to modify.

7. The system of claim 1 wherein:
   the mask value indicates which bits in the meter address to modify; and
   the per port meter value provides new content for the modified bits.

8. The system of claim 1, wherein the key is based on the source port information and an internet protocol (IP) address of the packet.

9. An integrated circuit, comprising:
   a content addressable memory that is arranged and configured to:
      receive a key which is based on source port information of a packet received on one of multiple ports, and
      output a match index value in response to a search of the content addressable memory using the key;

a policy memory module that is arranged and configured to receive the match index value from the content addressable memory and to output meter controls and a meter address based on the match index value;

a port meter map module that is arranged and configured to receive the source port information, map the source port information to a per port meter value and a mask value, and to output the mask value and the per port meter value to a remapping module; and the remapping module that is arranged and configured to:
receive the meter address from the policy memory module;
receive the mask value and the per port meter value from the port meter map module; and
modify the meter address based on the mask value and the per port meter value.

10. The integrated circuit of claim 9 wherein the content addressable memory is configured to include multiple services, each including a combination of multiple rules.

11. The integrated circuit of claim 10 wherein the rules are related to access control lists.

12. The integrated circuit of claim 10 wherein:
the remapping module is configured to output the modified meter address to a meter module; and
the system further a comprises the meter module having multiple meters that are arranged and configured to meter received packets, wherein the received packet is routed to one of the meters based on the modified meter address.

13. The integrated circuit of claim 12 wherein the modified meter address comprises:
a first section that includes a base address for the source port and the meter the source port can access; and
a second section that includes a service number, wherein the service number identifies an allocation of the services per each of the source ports.

14. The integrated circuit of claim 9 wherein the mask value indicates which bits in the meter address to modify.

15. The integrated circuit of claim 9 wherein:
the mask value indicates which bits in the meter address to modify; and
the per port meter value provides new content for the modified bits.

16. A method comprising:
receiving a packet on one of multiple ports;
parsing the packet;
generating a key, wherein the key includes source port information related to the received packet;
receiving the key;
outputting a match index value based on the key;
receiving the match index value and outputting meter controls and a meter address based on the match index value;
receiving the source port information, mapping the source port information to a per port meter value and a mask value, and outputting the mask value and the per port meter value;
receiving the meter address;
receiving the mask value and the per port meter value; and
modifying the meter address based on the mask value and the per port meter value.

17. The method as in claim 16 wherein the mask value indicates which bits in the meter address to modify.

18. The method as in claim 16 wherein:
the mask value indicates which bits in the meter address to modify; and
the per port meter value provides new content for the modified bits.

19. The method as in claim 16 further comprising metering the packet using the modified meter address.

20. The method as in claim 16 wherein the modified meter address comprises:
a first section that includes a base address for the source port and a meter the source port can access; and
a second section that includes a service number, wherein the service number identifies an allocation of services for each of the ports.

* * * * *

UNITED STATES PATENT AND TRADEMARK OFFICE
CERTIFICATE OF CORRECTION

| | | |
|---|---|---|
| PATENT NO. | : 7,945,725 B2 | Page 1 of 1 |
| APPLICATION NO. | : 12/101696 | |
| DATED | : May 17, 2011 | |
| INVENTOR(S) | : Eric Baden et al. | |

It is certified that error appears in the above-identified patent and that said Letters Patent is hereby corrected as shown below:

In column 9, line 29, in claim 12, after "further" delete "a".

Signed and Sealed this
Twelfth Day of July, 2011

David J. Kappos
*Director of the United States Patent and Trademark Office*